(12) United States Patent
Boyle et al.

(10) Patent No.: US 9,578,365 B2
(45) Date of Patent: Feb. 21, 2017

(54) HIGH QUALITY VIDEO SHARING SYSTEMS

(71) Applicant: H4 Engineering, Inc., San Antonio, TX (US)

(72) Inventors: Christopher T. Boyle, San Antonio, TX (US); Scott K. Taylor, San Antonio, TX (US)

(73) Assignee: H4 Engineering, Inc., San Antonio, TX (US)

( * ) Notice: Subject to any disclaimer, the term of this patent is extended or adjusted under 35 U.S.C. 154(b) by 0 days.

(21) Appl. No.: 14/399,724

(22) PCT Filed: May 15, 2013

(86) PCT No.: PCT/US2013/041187
§ 371 (c)(1),
(2) Date: Nov. 7, 2014

(87) PCT Pub. No.: WO2013/173479
PCT Pub. Date: Nov. 21, 2013

(65) Prior Publication Data
US 2015/0143443 A1    May 21, 2015

Related U.S. Application Data

(60) Provisional application No. 61/647,506, filed on May 15, 2012.

(51) Int. Cl.
*H04N 7/173*    (2011.01)
*H04N 21/2743*    (2011.01)
(Continued)

(52) U.S. Cl.
CPC .... *H04N 21/2743* (2013.01); *H04N 21/21805* (2013.01); *H04N 21/237* (2013.01); *H04N 21/2393* (2013.01); *H04N 21/23418* (2013.01); *H04N 21/251* (2013.01); *H04N 21/25891* (2013.01); *H04N 21/2665* (2013.01); *H04N 21/2747* (2013.01); *H04N 21/437* (2013.01);
(Continued)

(58) Field of Classification Search
CPC ............ H04N 21/21805; H04N 21/233; H04N 21/23418; H04N 21/2665; H04N 21/2743; H04N 21/4334; H04N 21/437; H04N 21/8113
USPC .................................... 725/86, 91, 105, 114
See application file for complete search history.

(56) References Cited

U.S. PATENT DOCUMENTS 7,453,488 B2    11/2008    Parker et al.
2004/0006424 A1 *    1/2004    Joyce .................... G01S 5/0027
701/408
(Continued)

FOREIGN PATENT DOCUMENTS

KR    1020110050999 A    5/2011

*Primary Examiner* — Jeremy Duffield
(74) *Attorney, Agent, or Firm* — Volk & McElroy, LLP; Michael D. Volk, Jr.

(57) ABSTRACT

A video sharing method for automatic video recording and for sharing recorded videos, comprising: registering specialized equipment and users; accepting and storing video files and music files; building searchable databases of uploaded video and music files; accepting user requests; selecting a music file; playing video files accompanied with the selected music file; and soliciting and accepting user feedback. A system plays video files at a user's request accompanied with music clips if desired.

3 Claims, 3 Drawing Sheets

(51) Int. Cl.
*H04N 21/433* (2011.01)
*H04N 21/437* (2011.01)
*H04N 21/218* (2011.01)
*H04N 21/237* (2011.01)
*H04N 21/2665* (2011.01)
*H04N 21/4788* (2011.01)
*H04N 21/2747* (2011.01)
*H04N 21/234* (2011.01)
*H04N 21/239* (2011.01)
*H04N 21/25* (2011.01)
*H04N 21/258* (2011.01)
*H04N 21/475* (2011.01)
*H04N 21/4784* (2011.01)
*H04N 21/61* (2011.01)
*H04N 21/81* (2011.01)
*H04N 21/858* (2011.01)

(52) U.S. Cl.
CPC ...... *H04N 21/4334* (2013.01); *H04N 21/4756* (2013.01); *H04N 21/4758* (2013.01); *H04N 21/4784* (2013.01); *H04N 21/4788* (2013.01); *H04N 21/6125* (2013.01); *H04N 21/812* (2013.01); *H04N 21/8113* (2013.01); *H04N 21/858* (2013.01)

(56) References Cited

U.S. PATENT DOCUMENTS

| | | | |
|---|---|---|---|
| 2006/0122842 A1* | 6/2006 | Herberger | G10H 1/368 704/278 |
| 2007/0050510 A1* | 3/2007 | Jiang | H04W 4/12 709/227 |
| 2008/0065695 A1* | 3/2008 | Adstedt | G11B 27/034 |
| 2008/0147786 A1 | 6/2008 | Liwerant et al. | |
| 2009/0238538 A1 | 9/2009 | Fink | |
| 2010/0183280 A1 | 7/2010 | Beauregard et al. | |
| 2012/0219271 A1* | 8/2012 | Vunic | G06K 9/00711 386/278 |
| 2012/0254925 A1* | 10/2012 | Nassiri | H04N 21/4668 725/92 |
| 2012/0263439 A1* | 10/2012 | Lassman | H04N 5/76 386/280 |

* cited by examiner

HIGH QUALITY VIDEO SHARING SYSTEMS

BACKGROUND

The present invention relates to sharing high quality videos with an audience and friends using an application (referred to as an "app"), or applications designed for mobile devices such as smartphones and personal digital assistants (PDAs), etc., and also usable on websites and by social networking tools and similar portals.

Recently, mobile phones and smartphones have made it easier for amateur photographers to capture interesting moments or images and share those images with their friends and the world immediately or almost immediately. In the era of virtually unlimited computer memory, an unskilled photographer with a smartphone may take dozens or even hundreds of pictures and then select one that is well framed giving the impression of a "good photographer's eye". In addition, the photographer may use apps to further improve the artistic quality of the selected photograph by applying image filters that may blur edges of the image or alter colors thereby further increasing the artistic nature of the photograph. Video, however, is a string of many related frames or images and does not lend itself to similar selection of the best images. When sections or parts of the video are shaky, blurry, poorly framed and the like, the only remedy is editing out the bad parts or re-shooting the entire video. Video quality is further complicated by the need for an appropriate and well-timed sound track. The quality of the content and the skill of the videographer, cameraman and editor are so fundamental to the resulting video that available smartphone tools (like filters) and the like simply do not have enough of an effect on the output to transform amateur video footage into high quality videos that would be pleasing to the general viewing public.

Current websites, social media networks, and mobile device applications dedicated to making and or sharing/distribution of videos are lacking because they simply do not address the fundamental problem that amateur videos are just that, amateur. All too often shared amateur videos are not pleasant to watch, or may even be difficult to watch, and therefore are not watched by many people. These facts make it difficult to generate advertising revenue or otherwise monetize the vast majority of amateur videos.

Since a 2010 statistic asserts that the average YouTube video was viewed close to 100,000 times, it is safe to assume that there are many more consumers of on-line videos than those generating them. It is therefore very desirable to determine who produces good videos and find a system that rewards those who do. The systems and methods hereof also assist finding and rewarding authors of good videos.

Further, while the use of smartphones to record video content has increased, the quality of the resulting video on average is down. Thus, a problem exists regarding the quality of video recorded by "amateur" videographers.

SUMMARY

According to a preferred embodiment hereof, this invention provides a video sharing system comprising a plurality of recording devices capable of automatically recording videos and that may be operated by a first set of independent users and which recording devices are capable of connecting to networks such as the Internet; a host computer system such as a website to receive video files such as streaming feeds from the plurality of recording devices; and a plurality of Internet enabled devices, operated by a second set of users which may overlap in part or in whole with the first set of independent users, each running at least one application configured to connect to the host computer system and potentially to additional computer systems such as websites and networks and to play and stream the video files that have been uploaded to the host computer system.

According to another preferred embodiment hereof, this invention provides a video sharing method comprising the steps of registering specialized equipment for automated video recording, such as an automatic cameraman or an automatic camera capable of automatically pointing at a target; registering users who intend to participate in the video sharing by watching videos, by uploading video files, or by uploading music files; accepting and storing video files and music files, including credits, uploaded by registered users (such step may be accomplished via connection to one or more public video, photo or music sharing services such as YouTube, Pandora and iTunes); building searchable databases of uploaded video and music files and by utilizing pre-existing searchable databases of public networks; accepting user requests to play particular videos from the searchable database; selecting a music file for the video requested (selection may also be made from the memory of the device from which the user uses to connect to the network); playing video files accompanied with the selected music file as a sound track and including credits for both the video and music files, company logos, and advertisement; and soliciting and accepting user feedback regarding the video and music either together or separately.

According to yet another preferred embodiment hereof, this invention provides a video sharing method comprising the steps of registering users who intend to participate in video sharing by watching videos, by uploading videos, and by uploading music; accepting uploads of video files including credits and uploading user preferences for music genre and source of music files to be played with the video, wherein the source selection is between music files uploaded by users and music files available from sources of professionally recorded music; accepting uploads of music files, including credits, and selection of a music genre; building searchable databases of uploaded video and music files; linking to music providers of professional music and obtaining music files from the same; accepting a user request to play a video; selecting a music file for the video requested from the database of uploaded music or from providers of professionally recorded music; playing video files with selected music files as soundtracks, including credits company logos, and advertisement; and soliciting and accepting user feedback regarding video and music.

According to yet another preferred embodiment hereof, a mobile device application enables the device which records video for upload or an intermediary device, such as a smartphone, to connect directly to a host computer system and/or one or more social networking web sites.

This invention also provides each and every novel feature, element, combination, step, and/or method disclosed or suggested herein.

DETAILED DESCRIPTION OF THE PREFERRED EMBODIMENTS

The systems and methods of the present invention solve the problems associated with video content recorded, for example, by amateur videographers using smartphones.

To solve content quality problems, the systems and methods hereof include tools that amateur videographers can use to improve video quality along with rules for making good videos that then may also be easily shared with others.

The present invention is based on the inventors' analysis of the features or requirements to make good (i.e., high quality) video. These features and requirements are (i) good, interesting, current content, (ii) professional camera handling, (iii) appropriate sound or soundtrack, (iv) editing for length and or content, and (v) additional effects. The systems and methods hereof make it quick and easy for amateurs to generate and share high quality video recordings (HQVR) with minimal disruption of their routine.

The issue of content is of primary importance. Good content is interesting. Further, more current video content is more "newsworthy" and thus better. For example, a video of a recent event is deemed more interesting than a video of something that happened two months ago. For example, current social media applications like Twitter and Facebook provide short updates of what is presently happening.

The importance of interesting content is supported by the statistics. Even though sport videos constitute only about six percent of videos on YouTube (compared with about thirty percent for music videos, the most popular category), sports video's "favorite" count is much higher than that of any other video category, even music (1514.7 vs. 986.5). Further, sport videos are viewed much more frequently. See Syomos, Inc., "Inside YouTube Videos", available at the URL address www.sysomos.com/reports/youtube/.

The systems and methods of the present invention provides an integrated system of (i) specialized video recording equipment that is well suited for recording planned activities such as sporting events and activities and operated by a large number of independent owners/users, (ii) computer programs such as mobile device apps, and (iii) a host system such as a website where high quality video recordings are posted, shared, and feedback is stored. This integrated system helps users create and share good, interesting, current content with smooth camera movements. Using specialized video recording equipment implies planning, and the planning aspect further contributes to recording high quality video, whether it is a sport, or other event that one records. The specialized equipment also provides for instantaneous or near instantaneous upload of videos such as streaming of videos. Additionally, as described further herein, the host computer system assists in matching videos with soundtracks, preferably musical, that may further improve the quality of the video.

The following documents are hereby incorporated by reference in their entirety: U.S. patent application Ser. No. 13/726,222, titled "System and Method or Initial Setup of an Automatic Recording System", U.S. patent application Ser. No. 13/726,355, titled "Automatic Orientation of a Pointing Device Using a Single Global Positioning Unit", U.S. patent application Ser. No. 13/726,380, titled "A Portable System for Automated Video Recording", U.S. patent application Ser. No. 13/726,451, titled "Feedback and Manual Remote Control System and Method for Automatic Video Recording", U.S. patent application Ser. No. 13/782,862, title "Apparatus and Method for Automatic Video Recording", and U.S. patent application Ser. No. 13/801,336, titled "System and Method for Video Recording and Webcasting Sporting Events".

The app described herein may include tools for video editing while forcing a limitation on video length. This is an important step because, as statistics show, people tend to post much longer videos (on average about four minutes but, notably, the average length of the sport videos is only about three minutes; see www.sysomos.com/reports/youtube/). In the inventors' experience, only professional videos are watchable when the length exceeds a few minutes. After 30 seconds have elapsed in an online video, up to 33% of viewers have moved on; at one minute, 44% have left (regardless of the clip's length); and almost 60% of viewers have abandoned the video by the two-minute mark. See Engage, the Blog, "101 Video Stats to Make Your Eye's Glaze Over, available at the URL address engage.tmgcustommedia.com/2011/04/101-online-video-stats-to-make-your-eyes-glaze-over/.

The additional effects that augment video quality may include transitions between different camera angles, special effects, like slow motion and accelerated speed, and others.

The systems and methods hereof further provide an ability to both be a part of the action and immediately and automatically edit and share a newsworthy video clip as it is happening, or just after it happens, or to have a person or program manage the broadcast without the subject having to stop participating in the action (such systems and methods are further described in co-owned and co-pending U.S. patent application Ser. No. 13/801,336, titled "System and Method for Recording and Webcasting Sporting Events" and corresponding PCT Patent Application No. PCT/US2013/31001, the contents of which are hereby incorporated by this reference in their entirety). Finally, the system is capable of automatically adding professional looking effects such as transitions and credits without requiring much effort by the user sharing the video while still in the heat of the activity.

In summary, there are shortcomings of video sharing today that the present invention remedies. Video content for sharing needs to be interesting, the camera movement must be smooth, and sharing must be easy. The systems and methods of the present invention include hardware to record HQVR and post or stream videos taken, for example, at sports venues from either a spectator's vantage point or participant's point of view. Another problem is that videos, particularly amateur videos, often tend to be too long and show uninteresting, poorly edited footage rather than brief and exciting clips. Generally speaking, HQVR is hard to achieve and forcing people to cut video length is a good way to make them select the best part of the footage. If the video clip is appropriately cut it may give the impression of being well edited or professional. A further problem addressed by the invention is that the sounds accompanying many amateur videos are either unrelated to the visuals, or of poor quality. Such videos may be much improved by playing them with music or a soundtrack that fits the mood and tempo of the footage. It is expected that users of the app or websites and consumers of the videos will appreciate the improved appearance and enjoyment value of their videos and the videos of their peers and that sharing videos will become an even larger part of the cyber and social experience than it is today. Further, the feedback features and system responses to feedback will reward the best videos and their authors will be able to earn posting privileges and even monetary rewards; thus, professional quality posting by amateurs will become more prevalent.

The embodiments described herein mention use of the Internet. However, it should be understood that while the Internet is a preferred network, many features of the invention may be implemented in part or entirely on other possible networks; using a different network alone or in conjunction with the Internet should not be construed as a departure from the invention.

Figure 1:
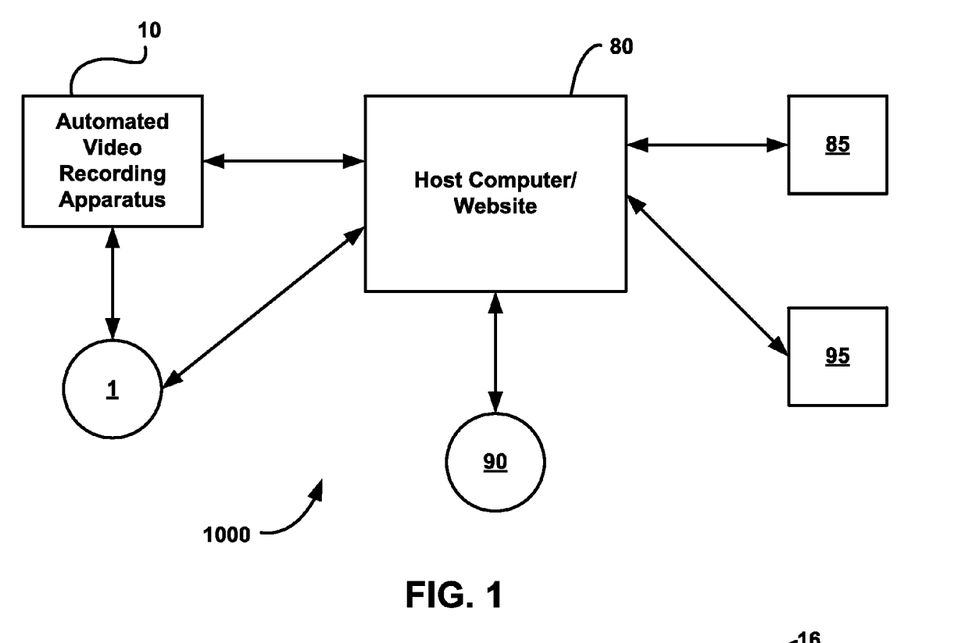
FIG. 1 shows a block diagram illustrating the components of a high quality video sharing system according to a preferred embodiment of the present invention.

FIG. 1 shows a block diagram illustrating the components of a high quality video sharing system 1000 according to a preferred embodiment of the present invention. High quality video sharing system 1000 comprises a host computer system 80 programmed to accept video files and music files uploaded by users of host computer system 80. Host computer system 80 creates searchable databases of the uploaded videos and music files, among other tasks. It should be understood that host computer system 80 may comprise a plurality of networked computers. User/viewer 90 accesses content stored on host computer system 80 via a website accessible through the Internet. High quality video sharing system 1000 further includes automated video recording apparatus 10 operated (and perhaps owned) by an individual user/subject 1. The automated video recording apparatus 10 records videos of the activities of user/subject 1 who is the subject of the automated video recording. Such an automated video recording apparatus is described and enabled herein below and in the documents incorporated by reference above, namely U.S. patent application Ser. Nos. 13/726,222, 13/726,355, 13/726,380, 13/726,451, 13/782,862, and 13/801,336. Reference should be made to these documents for further description of the details and features of the automated video recording apparatus 10. Such an automated video recording system preferably comprises appropriate hardware to connect to the Internet.

The system further comprises providers or sources of music, both of amateur music 85 and of professional music 95, each of which may be individual users, or music aggregating websites, or other entities. While FIG. 1 only shows one automated video recording apparatus, one user/subject, one user/viewer, one provider of amateur music, and one provider of professional music, it should be understood that there may be more than one of each. Indeed, host computer system 80 and its associated web site may interact with a large number (thousands, perhaps hundreds of thousands) of automated video recording apparatuses, with an even larger number of users (both subjects and viewers), and with many music providers (both professional and amateur).

Additionally, users/subjects 1 may upload video they record with automated video recording systems 10 to the host computer system 80. Host computer system 80 is programmed to augment the videos with music tracks using music uploaded by users or provided by music aggregators. Once augmented as such, the videos are made available to be browsed and watched by users/viewers 90. While FIG. 1 illustrates three different users types (subjects, musicians, and viewers), in practice the same person may act in any or in all of the three roles at different times. While FIG. 1 shows users 1, 90, 85, and 95 in direct contact with computer 80, it is understood that such connection is facilitated with appropriate interface devices (Internet capable phones, tablets, laptop computers, etc.).

Figure 2:
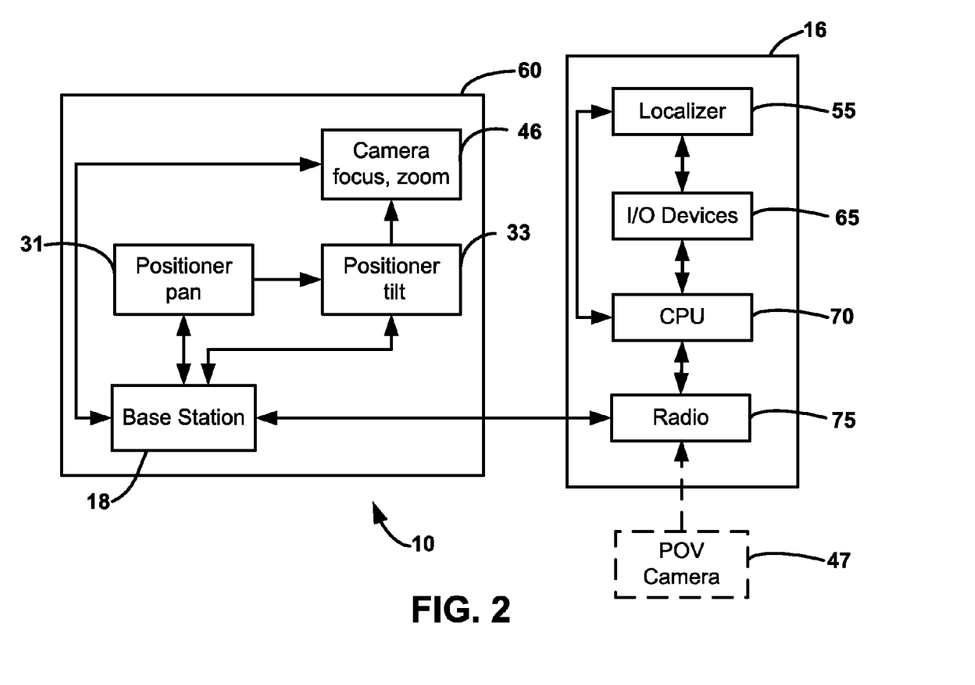
FIG. 2 shows a block diagram illustrating a video recording apparatus according to a preferred embodiment of the present invention.

FIG. 2 shows a block diagram illustrating a video recording apparatus 10 according to a preferred embodiment of the present invention. Video recording apparatus 10 is an automated video recording system that records videos of an activity from a spectator's point of view. In the particular embodiment shown in FIG. 2, the apparatus comprises two main components: the base unit 60 and the remote unit 16. The base unit 60 comprises base station 18, camera positioners 31 (camera positioner pan) and 33 (camera positioner tilt), and a camera 46 with focus and zoom controls (in addition to other standard camera controls). The remote unit 16 is collocated with the subject of the recording and moves with him or her. Each remote unit 16 is collocated with a user/subject 1 (see FIG. 1) and is used to generate data necessary to orient and, to an extent that depends on the particular features of the video recording apparatus 10, to otherwise control camera 46 in order to record the activities of the subject 1 as he or she moves around.

The remote unit 16 comprises localizer 55, Input/Output (I/O) devices 65, CPU 70, and radio 75. The localizer 55 is a device, or a set of devices, that is used to determine at any given time during recording the current location of the remote unit 16 and thus the location of the subject. The main component of localizer 55 may be a GPS receiver that receives and parses communication from satellites. It may also be an electromagnetic radiation sensor that receives and parses signals from base unit 60 and may also be a source of electromagnetic radiation which is received and parsed by base unit 60. The I/O devices 65 are devices that accept user input including commands to upload video to the video sharing host computer (80, FIG. 1). The I/O devices 65 also output status information for the user; these devices may be an LED that indicates that recording is "on", or may be touchscreen displays or similar devices. Some I/O devices may serve both input and output functions and may permit the subject/user to preview the video prior to uploading and to supply credits (e.g., authorship information or other information about the content of the video) for the video. A CPU 70 is present to assist in carrying out the functions and features of the remote unit 16. Radio 75 is the preferred means of communication between the remote unit 16 and the base unit 60. Radio 75 may also serve for communication with host computer 80 shown in FIG. 1; this communication may also be through intermediary devices, wireless networks, telephone lines, or satellites, for example.

The communication between remote unit 16 and base unit 60 enables the base station 18 to control camera orientation, zoom, and focus so as to record videos of the activities of subject 1 (see FIG. 1). Base unit 60 comprises base station 18, camera pan and camera tilt positioners 31 and 33, and a camera 46 with adjustable zoom and focus, preferably controlled by base station 18. In alternative embodiments some elements of the base unit 60 may not be controlled by base station 18 (for example, there may be a traditional camera autofocus instead of computer controlled focusing based on the distance between remote unit 16 and camera 46). Base station 18 preferably comprises a CPU that parses location information and provides control commands to the positioners 31 and 33 and to camera 46. Additionally, base station 18 preferably comprises a radio for communication with remote unit 16 and to establish Internet/data connection either directly, such as by using a cellular link, or through a Wi-Fi connection to a nearby network or through a tether (using a cellular link such as one through the user's cell phone). The commands of base station 18 are generally based on a system that uses the location information of remote unit 16 to orient camera 46 to point at the subject as he or she moves and to adjust the focus and zoom of camera 46 to record high quality video of the user. The user may use I/O devices 65 of remote unit 16 to send commands to base station 18 that override preprogrammed orienting and recording actions of base unit 60. In some embodiments, base station 18 may include its own localizer enabling it to determine and store its own position in an earth fixed coordinate system or its position relative to the remote unit 16. CPU 70 and radio 75 of the remote unit may also include a direct cellular link to the Internet or the ability to connect to a local Wi-Fi network.

Camera 46 may be equipped with a microphone; recording sound using this microphone may be useful for the purposes of recording certain videos. For example, recording an announcement regarding speed during a car race or a ski jump may be very informational and entertaining when the resulting video is watched. Remote unit 16 may also be equipped with a microphone. In some situations, the sound recorded by camera 46 may be irrelevant to the video being recorded. For example, when recording a surfing activity, comments by the surfer would contribute to a better appreciation of the video. In addition, voice commands received by the remote unit microphone may be used to control, override, or otherwise communicate with base unit 60.

Base unit 60 may or may not be stationary (meaning that during recording the location of the base unit 60 is fixed, although base unit 60 may otherwise be portable and may be set up at various locations where the user wishes to record his activities). In many applications, it is preferably that the base unit be portable to many locations for recording purposes. In applications where base unit 60 is stationary, a setup procedure is preferably used to determine the location and initial orientation of camera 46. This setup procedure is not necessary if base unit 60 also comprises hardware that enables it to determine the camera's location and orientation. Such hardware may include GPS receivers, accelerometers, altimeters, levels, magnetometers, and the like. These instruments (with the exception of GPS receivers and similar devices) may be referred to as inertial measurement units (IMUs). In applications where it is desirable to have base unit 60 mounted on a mobile platform (such as a vehicle, a boat, or the like), either the mobile platform or base station 18 is equipped with devices that enable it to recognize changes in location and spatial orientation as those may change as the platform moves. In cases where the platform may have restricted movements (such as movements along a rail, or computer controlled movements), it is possible to use the restrictions or the computer control to supplement or even to replace functions of the GPS receivers and IMUs.

Base station 18 and/or remote unit 16 are parts of high quality video sharing system 1000 (see FIG. 1) and as such are recognized when they communicate with other parts of video sharing system 1000 (e.g., host computer system 80). This arrangement is useful in that logging in and uploading recorded videos to host computer system 80 shown in FIG. 1 may be straightforward or even automatic. The base station 18 and remote unit 16 may also be software platforms that allow users so inclined to write software applications for the system using a manufacturer supplied Software Development Kit (SDK).

In a preferred embodiment hereof, video files that are uploaded to host computer system 80 are preferably brief in duration (preferably approximately 15 to 60 seconds long). The video files (which may also be referred to as video clips) are uploaded to host computer system 80 where the user/subject 1 has a registered account. When surfing, the surfer normally spends extended periods of time paddling to areas where the surf is good to attempt to catch a wave. When he or she succeeds and has a reason to believe that a great video has been recorded (i.e., he or she has just caught and surfed a wave) he or she commands base station 18 to upload the recorded video file to host computer system 80 and post the video on the related web site for later viewing or for others to view. In a variation of the process described, and in order to make an informed decision about posting a video by the subject, an instant playback feature may be available on a screen associated with remote unit 16. In such a preferred embodiment, remote unit 16 may be Internet enabled and further may be the device used to upload the video to host computer system 80. In such a preferred embodiment, the user is able to almost immediately share his or her accomplishment with his friends, followers, and the world.

In a preferred embodiment, high quality video sharing system 1000 preferably comprises software to sort videos by duration into groups (also referred to herein as bins) such as, for example, zero to 30 seconds, 30 to 45 seconds, 45 to 60 seconds, etc. Additionally a mobile device application (also referred to herein as an app) is preferably made available to assist users in selecting, editing, and uploading videos they wish to share with others. Videos may be cut to a particular "bin" length using markers on a screen displayed ruler that displays the running time of the video within the app; additional markers may be used to designate footage to be played at accelerated speed (using command buttons such as >> for twice as fast and >>> for three times as fast, for example), or at reduced speed (command button such as ½ for ½×). When parts of a video are played in accelerated mode, a longer video may fit into a shorter time bin. A video clip, or a portion of it, may be played in slow motion for enhanced effect. Preferably, the number of choices for video editing is not too numerous so that editing and uploading is as automatic and pleasant as possible, particularly for amateur videographers.

FIG. 2 shows an additional preferred feature which includes recording and uploading point of view video. In some preferred embodiments, remote unit 16 may be connected with a point of view (POV) camera 47 that is substantially collocated with subject 1 and is operated either manually or automatically. In such an embodiment, base unit 60 may or may not be used. In such a preferred embodiment, remote unit 16 is integrated with a wearable camera 47 that records point of view (POV) videos. Preferably, remote unit 16 transmits recorded POV video to base station 18 for uploading to host computer system 80 or may directly upload the recorded POV video to host computer system 80. In a further preferred embodiment, the automated "spectator's view" recording generated using base unit 60 and video recorded with POV 47 are synchronized and automatically formatted to be playable on a split screen, picture in picture (PiP), or sequential arrangement. Such formatting may preferably be performed by the host computer system 80.

Figure 3:
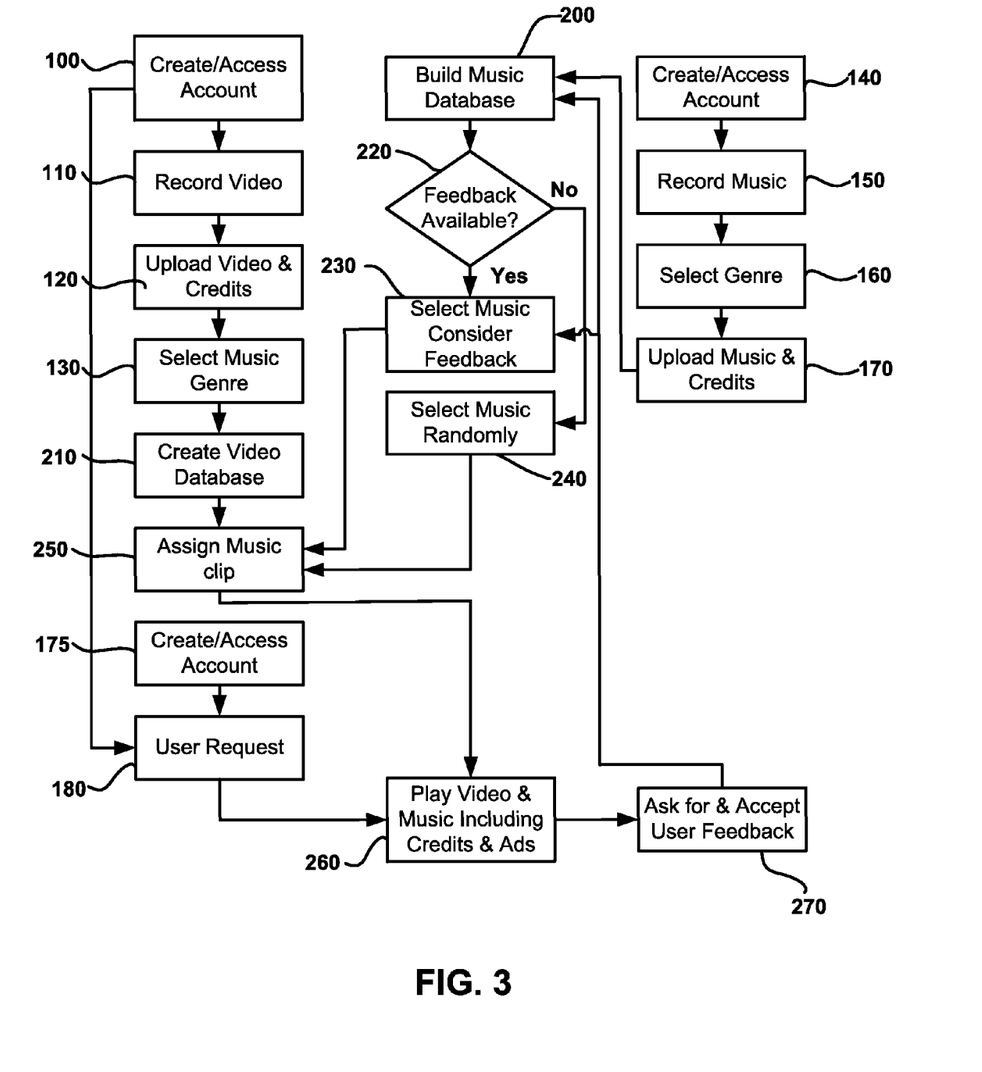
FIG. 3 shows a flow diagram illustrating a video sharing method according to a preferred embodiment of the present invention.

FIG. 3 shows a flow diagram illustrating a video sharing method according to a preferred embodiment of the present invention.

Referring to FIG. 3, the parts of the software that depend on user action are identified by numbers 100-180; those parts of the software that represent actions by host computer system 80 are identified by numbers 200-270. As described with respect to FIG. 1, host computer system 80 accepts video file uploads and music file uploads. Both file types are either user-generated products or products that the uploader has permission to upload. Users register with a web site associated with host computer system 80 and may create active accounts that permit uploading in step "create account" 100 (uploading of video) and "create account" 140 (uploading of music). It is noted that once the account is created, the user may simply access his or her account as noted in FIGS. 3 and 4. Additionally, a user may register a "passive" account that does not permit uploading (create account 175). During registration, users create profiles that include at least the following information, a username, an electronic address, a list of friends, etc. Preferably, user profiles may be modified by the user at any time. An electronic address may be an e-mail address or other similar unique identifier that enables electronic communication with the user (e.g., a Twitter, Skype or Facebook user name, and the like). Those who wish to view content must register with an account, either an active account or a passive account. When registering an active account in step "create account" 100, a selection may be made whether, in general, the videos that will be posted from that user's account will be visible to all users or only to a subset of users. When posting a video, the user may be provided with the option to override this selection. When registering a music related account in step "create account" 140, the user creates a profile that also includes the name of the musician or band. When registering with the web site, the users also agree to allow the uploaded content to be combined with other content on the web site. For example, the users agree that uploaded videos may be played with or combined with any music clip uploaded on the web site. The user may enter information to generate default credit lines (i.e., authorship information, date, location of filming, etc.) at registration (or at any time thereafter) that will be used to credit uploaded videos and/or music (unless the user overrides the default credit when uploading a specific file).

The registration process permits linking of a hardware device, such as automated video recording apparatus 10, to a user account. Once the hardware device is registered, upload of content from that device is allowed automatically without further authentication. A user may register multiple devices with his or her account. Also, users may be given the option to register other Internet enabled devices (like smartphones). By permitting registration of other Internet enabled devices, it is possible for a single user to generate and upload video using the automated video recording device of FIG. 2 while also consuming or watching videos on a mobile device or using a computer used to access the website. The web site contemplated herein allows video file and music file uploads from mobile and other devices as long as the time limit set by the video sharing website (i.e., the clip duration limit, preferably 15 to 60 seconds for both videos and music) is observed and authentication is provided. Longer uploads (with certain exceptions) may be automatically truncated. Alternatively, the application interface preferably provides a slider showing the maximum amount of footage or music to be included in a clip and the user may select the truncation points. The application interface further provides the option of designating parts of videos to be played at accelerated speed or in slow motion. Once the video or music is recorded (steps 110 and 150, respectively) they may be uploaded, steps 120 and 170, respectively. Video uploaders are asked to select from a menu a music genre to be played with their video, 130. In order to make uploads faster, the user may set a default music genre for his videos at registration or at any time thereafter. If a default is set, it will be applied unless the user overrides it at the time of uploading. Music uploaders are asked to select (input) a genre from a menu, 160. Both video and music uploaders may input credits following the upload if they wish to use other credits than a default one established when registering, or at any later time. The credits provided at registration are overridden if different credits are provided at the time of uploading. Credits may be limited by the number of lines (preferably one or two lines) or by character length. Credits may comprise title, date, location, authorship, and any other desired information. The automated video recording apparatus 10 (see FIG. 2) may be capable of adding a location stamp and/or a time stamp to a recorded video for inclusion in the credits of the uploaded video.

The host computer system 80 builds searchable databases of the uploaded music clips, 200, and of the uploaded videos, 210. When a request is made by a user to play a certain video 180, the software assigns and appends a music clip to the video, 250, and plays them together, 260. The video plus music clip ends showing both video and music credits. Advertisements may also be included. Users are asked to give feedback separately for the video and for the music and the feedback is registered, 270. The music feedback is used to give preference to various clips if it has received positive feedback. This is done first by deciding whether user feedback is available, 220, and using a random but weighted, 230, or a completely random, 240, selection method depending on whether feedback has been received (Yes) or not (No).

According to a preferred embodiment of the present invention, software displays the videos within a frame that also displays the logo of the video sharing hardware and/or website. The frame of the video may serve as a location for advertisements. Similarly a "water mark" may be applied to some or all videos either advertising the application, hardware, or for traditional advertising.

According to another preferred embodiment of the present invention, the music genre menu (list) provided to video uploaders when they select a genre, 160, encompasses a wide variety of popular music genres, including a generic "other". However, the menu (list) of music genres presented to music uploaders is limited to those previously selected by at least one video uploader and a generic "other". This method, combined with a random element in music selection ensures that all uploaded music has a chance to be played.

According to yet another preferred embodiment of the present invention, the software is programmed to identify extreme movements, lighting changes, transitions, and/or tempo within video clips and searches for music clips within the database with sound effects, such as rhythm, drums, crescendos and the like, that match the timing seen in an uploaded video. The software gives preference to playing videos with music that includes matching sound effects if available. Otherwise, the music clip selection may be entirely random or preferred music may be played more frequently. However, the random selection feature may always be present in the music selection, thus the software ensures that all music clips have some chance to be played.

According to yet another preferred embodiment of the present invention, the video and music uploads are facilitated by apps that may be downloaded to mobile web ready (Internet enabled) devices. The uploading is facilitated from these devices by automatic authentication of the user and easy editing of the video or music clip for the required duration. For example, a user may upload a live track of their band playing a gig recorded by their smartphone. They may also, at a different occasion, upload a video made by the automated video recording device showing them or another subject surfing or playing soccer, for example. They may force selection of their own music file to be played with the video or let the system select which videos the sound recording plays for and which sound track plays with their video recording.

According to another preferred embodiment of the present invention, the software keeps track of how many times a video has been played in total and how many times a video has been played per request of users who are not directly associated with the uploader of the video clip (i.e., they are not "friends" on the web site or the like). The software also keeps track of positive and negative feedback. Users whose videos are played more frequently and elicit more positive responses may accrue privileges on the video sharing. Such privileges may include, for example, the following: uploading longer video clips, uploading sound (including, for example, music clips or commentary) to be played with their video clips, choosing specific music clips (not just genre) to be played with their video clips. When videos "go viral" (i.e., when many or most watchers of a particular video clip are not friends or acquaintances of the uploader) the uploader may also be entitled to a cash reward or other bonuses.

Figure 4:
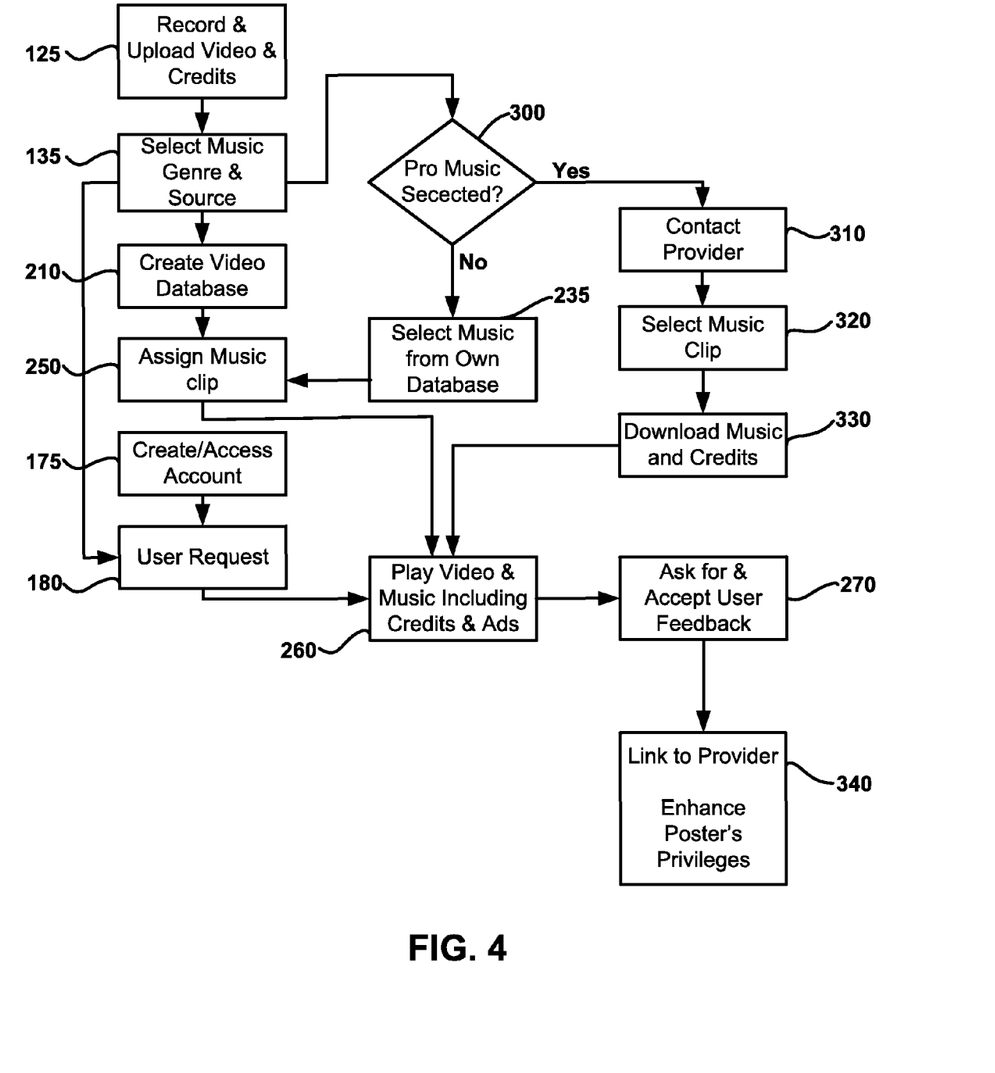
FIG. 4 shows a flow diagram illustrating another video sharing method according to a preferred embodiment of the present invention.

FIG. 4 shows a flow diagram illustrating another video sharing method according to a preferred embodiment of the present invention. In the flow diagram of FIG. 4, the actions of creating/accessing an account, recording and editing a video, signing in and uploading the video are carried out in step 125. Several of the steps in FIG. 4 are the same or similar as described with respect to FIG. 3. Uploaders of videos select music genre and source in step 135. The software creates searchable video (and music, not shown) databases from uploaded files in step 210. When a video is requested by a viewer in step 180, a music clip is assigned in step 250. In this preferred embodiment of the present invention, music may be selected from amateur or from professional (pro) sources, 300. For the purposes of this description, amateur music source relates to music and the related description (i.e., credits and genre) uploaded to the video sharing web site as detailed in FIG. 3; the selection of amateur music means a selection from the database containing amateur music uploads, 235. Pro music sources are those web sites or services that enable music downloads and/or streaming, such as iTunes, Spotify, Pandora, Amazon, etc. Music clips are pre-aggregated and searchable databases already exist for these "pro" sources. If pro music is selected, step 300, the software contacts the selected provider, 310, selects a music clip, 320, downloads the music clip, makes note of the source and credits, 330, and plays the sound clip with the video, 260, upon user request, 180. (The requesting user must be registered or must register before having access to such features, 175). This system may take advantage of the fact that some sites or services permit users to listen or stream a "free" 30-second or similar sample of a song to be listened to before customers make purchases. Preferably, the owners of the video sharing web site have a special agreement with the pro music site or service to permit such synchronization of music samples with video clips. The methods described with the aid of FIGS. 3 and 4 may allow many songs to be sampled by many users who may not otherwise ever hear, let alone purchase, such content. Step 330 may be modified to exclude downloading when the music is played via streaming, such as through Internet radio stations. Users may also have an option to play music already saved on their video displaying devices if that is their preference (not shown). User feedback is solicited and accepted, 270, and it may trigger further action, 340, that rewards posters of popular videos and sources of popular music. For example, the user may follow a link to the provider of the music clip or a direct link to purchasing the music may be provided. Also, in response to repeated positive feedback for a poster, he or she may be allowed to obtain privileges such as described in the previous paragraph (to post video with its own soundtrack, post longer videos, etc,). Also, a user may get credits at a particular music-selling site if that user's videos consistently lead to music sales. User feedback may also include recommending the video and or music to other users and to make a link to the clip available on other social network sites.

In a preferred embodiment, the software also permits flagging a video for offensive or inappropriate content. Such videos are automatically removed and at the earliest availability an administrator reviews the removed video and decides either to reinstate the video or to permanently remove it. Users who repeat posting offensive or inappropriate videos may be temporarily or permanently banned and such banning may extend to their registered uploading device not just to their particular account.

In a further preferred embodiment of the present invention, a method the inventor's refer to as "wisely chosen videos" is employed. In an effort to keep only the most interesting videos on a user's video feed, the concepts of "interesting people" (or "interesting person" among users who post videos) and of "interesting videos" is hereby introduced. Such a methodology uses the following: (1) interesting people take interesting video footage and post it/them; (2) viewers (users) subscribe to the interesting people's profile(s); (3) when a new video is posted by an interesting person, the video gets posted to viewers video feed; (4) as viewers send feedback (by votes or rating) about a particular video, and if such video gets poor ratings, it is gradually removed from users' news feeds by a weighing method based on a combination of random chance and video rating (high rated videos stay on viewers' newsfeeds longer, low rated videos are randomly removed from viewers' news feeds; the percentage of news feeds from which they get removed is based on the rating score).

When viewers subscribe to interesting people's profiles, they may choose to be shown all videos posted by that person, or only videos voted to be high quality, or by the "wisely chosen videos" method described above.

In another embodiment of the present invention, a user may upload a longer version of a video part of which was truncated during a prior upload. There may be a time (duration) limit set for the longer version as well; this limit may be extended for users who have produced good feedback to their earlier uploaded videos. The default mode of the system hereof is to provide as a default short video clips but may include a hyperlink to the extended version. If a user clicks the link he or she may view the extended version which action may be weighted as positive feedback for a given video clip.

This system may be used to disseminate professional content as well, such as movie trailers. For example, by opting in to a given news feed, the system may automatically post professional content that users may find interesting, such as clips of television shows and movies including movie trailers. This system may ban traditional commercials or may allow them to also be randomly inserted in various places. Similarly, the system may ban text or other clickable advertisements that detract from user experience and have no benefit, or, worse, negatively impact the user.

The embodiments described above may be employed separately or in combination.

In a preferred embodiment, the automated video recording apparatus 10 (see FIGS. 1 and 2), by virtue of being parts of high quality video sharing system 1000, are recognized by host computer system 80 and are permitted to upload videos without further authentication. This privilege of "automatic"

authentication may be revoked by the operator of system 1000 if abused. Other users may register and upload videos recorded using other video recording devices and uploading devices such as desktop computers, smartphones, tablet computers, and the like as well. Host computer system 80 may be programmed to limit the time (duration) of uploaded videos and music to particular values and to match videos with appropriate music clips when played upon request of user/viewer 90.

Preferably, a mobile device application enables the device which records video for upload or an intermediary device, such as a smartphone, to connect directly to a host computer system and/or one or more social networking web sites. A user of the mobile device application logs in to his or her account on a particular social network to post or watch videos (as when using YouTube) or to connect and interact with other users (as when using Facebook). After posting content, the social network web sites notifies the user's friends and subscribers so that they can more easily watch content they may find interesting. The mobile device application facilitates posting content to social networking web sites to utilize user's feed notices which notify others that new content is available. The new content may be posted or it may be a live feed.

Different embodiments, features and methods of the invention are described with the aid of the figures, however the particular described embodiments, features and methods should not be construed as being the only ones that constitute the practice of the invention and the described embodiments, features and methods are in no way substitutes for the broadest interpretation of the invention as claimed.

What is claimed is:

1. A video sharing method comprising the steps of:
   a) registering users who intend to participate in video sharing by watching videos, by uploading videos, and by uploading music;
   b) accepting uploads of video files, including credits, and uploading user preferences for a music genre and source of music files to be played with uploaded video, wherein the source selection is between music files uploaded by users and music files available from sources of professionally recorded music;
   c) accepting uploads of music files, including credits, and selection of a music genre;
   d) building searchable databases of uploaded video and music files;
   e) linking to music providers of professional music and obtaining music files from the same;
   f) accepting a user request to play a video;
   g) selecting a music file for the video requested from the database of uploaded music or from providers of professionally recorded music;
   h) playing video files with selected music files as soundtracks, including credits company logos, and advertisement; and
   i) soliciting and accepting user feedback regarding video and music;
   j) limiting the length of video and music file uploads to 60 seconds;
   i) extending privileges of users who have uploaded videos that received multiple positive feedbacks to upload longer video files and to select sound files to be played with the video files;
   k) modifying selection of music files played with video files such that music of users who have received multiple positive feedbacks is played more frequently.

2. The video sharing method of claim 1 further comprising the steps of
   a) analyzing video and music files by identifying points of emphasis and tempo in the visual and sound effects, and
   b) modifying the selection of music files to be played with particular video files based on the results of such analysis.

3. The video sharing method of claim 1 further comprising of allowing instant posting from preapproved devices without user identification.

* * * * *